(12) United States Patent
Mil'shtein et al.

(10) Patent No.: US 7,031,502 B1
(45) Date of Patent: Apr. 18, 2006

(54) ADJUSTABLE GUIDE FOR VIEWING BIOMETRIC SURFACE PATTERNS

(75) Inventors: Samson Mil'shtein, Chelmsford, MA (US); Jason Pinsonnault, Palmer, MA (US); Craig M. LaBrecque, Methuen, MA (US)

(73) Assignee: University of Massachusetts Lowell, Lowell, MA (US)

( * ) Notice: Subject to any disclaimer, the term of this patent is extended or adjusted under 35 U.S.C. 154(b) by 593 days.

(21) Appl. No.: 10/057,316

(22) Filed: Jan. 25, 2002

Related U.S. Application Data

(60) Provisional application No. 60/264,879, filed on Jan. 29, 2001.

(51) Int. Cl.
*G06K 9/00* (2006.01)
(52) U.S. Cl. ..................................... 382/126
(58) Field of Classification Search ................ 382/126, 382/115, 124; 396/14, 15; 340/5.52–5.53
See application file for complete search history.

(56) References Cited

U.S. PATENT DOCUMENTS

| | | | | |
|---|---|---|---|---|
| 4,357,597 A | * | 11/1982 | Butler | ........................ 382/115 |
| 5,177,802 A | * | 1/1993 | Fujimoto et al. | ........... 382/124 |
| 5,351,310 A | | 9/1994 | Califano et al. | .............. 382/22 |
| 5,633,944 A | | 5/1997 | Guibert et al. | .............. 382/100 |
| 5,703,970 A | | 12/1997 | Atashroo | .................... 382/278 |
| 5,892,838 A | | 4/1999 | Brady | ........................ 382/115 |
| 5,995,014 A | * | 11/1999 | DiMaria | .................... 340/5.52 |
| 6,108,458 A | | 8/2000 | Hart | ........................... 382/278 |
| 6,137,896 A | | 10/2000 | Chang et al. | ............... 382/118 |
| 6,301,370 B1 | | 10/2001 | Steffens et al. | ............. 382/103 |
| 6,504,945 B1 | * | 1/2003 | Helot et al. | .................. 382/126 |

* cited by examiner

*Primary Examiner*—Jingge Wu
*Assistant Examiner*—Ashutosh Upreti
(74) *Attorney, Agent, or Firm*—Hamilton, Brook, Smith & Reynolds, P.C.

(57) ABSTRACT

A guide can provide proper registration of an object such as a hand above a scanner device for imaging. The guide can include windows or slits so that the scanner device can produce an image such as a finger or palm in a natural state rather than being pressed against, for example, a flat surface such as glass. Thus, registration of a palm and/or a finger in the guide can be used to produce non-distorted high quality images of biometric patterns in their natural 3-dimensional state.

13 Claims, 5 Drawing Sheets

ADJUSTABLE GUIDE FOR VIEWING BIOMETRIC SURFACE PATTERNS

RELATED APPLICATIONS

This application claims the benefit of U.S. Provisional Application No. 60/264,879, filed on Jan. 29, 2001, the entire teachings of which are incorporated herein by this reference.

BACKGROUND

Surface patterns such as fingerprints typically are recorded for later associating a unique fingerprint with a corresponding person. Unfortunately, fingerprints and other surface patterns can be distorted depending on how much pressure is applied when making an image of the pattern. Consequently, it can be difficult for a computer or other digital device to identify a person associated with a particular print even though an image of the person's fingerprint is stored in memory for comparison.

SUMMARY OF THE INVENTION

One aspect of the present invention is directed towards registering a biometric object in a guide so that multiple surface patterns on the object can be viewed while the object is in a non-distorted state. The guide for aligning the object can include multiple windows on each of multiple rails for viewing different regions of the object. Typically, the guide can be reused so that similar surface patterns for recognizing the object appear in the windows each time the guide is used to register the object for viewing corresponding surface patterns. Consequently, the guide can be used to more accurately identify an object such as a person's hand, based on a recognized surface pattern.

In one application, the guide is adjustable to register different-sized but similarly shaped objects. Thus, a single adjustable guide can be reused to register each of multiple objects that fall into a particular class. For example, the guide can be formed to register different-sized objects such as hands and fingers.

Generally, images of an object registered in the guide can be compared to those stored in memory. Consequently, a unique surface pattern associated with the object can be identified.

Windows formed in the guide for viewing surface patterns can be openings through which patterns are viewed. When a surface pattern is viewed through such a void, the surface pattern on a 3-dimensional object is not unduly distorted by excess pressure. That is, the surface pattern of an object can be viewed without pressing the viewed region against a piece of glass. As a result, surface patterns on a 3-dimensional surface structure of the object can be viewed with a scanner device that produces a 2-dimensional image.

In one application, the guide is formed out of plastic. Consequently, the guide will less likely scratch a surface of glass on which it usually rests during the scanning process.

An underside region of the guide is optionally marked so that an imaging device viewing surface patterns through the windows can more easily identify an orientation of the guide and corresponding matter resting therein.

Consequently, a unique surface pattern and corresponding information associated with a scanned item can be stored in memory. At a later date, the same object can be registered in the guide to produce an image that is compared to those in memory. Based on the orientation of the registration guide in each case, a corresponding surface pattern can be more quickly recognized to identify, for example, a person associated with a fingerprint or palmprint.

Another aspect of the present invention is directed toward an adjustable device that enables viewing of surface patterns on similarly shaped objects of varying size. In addition to any of the features as previously discussed, such a device can include a first guide section to align an object for viewing a first portion of the object. The first guide section can include a window through which the first portion of the object can be viewed. A second guide section can be movably attached to the first guide section for aligning or registering a second portion of the object. The second guide section can include a second window through which the second portion of the object can be viewed. Accordingly, multiple surface patterns of an object defined in 3-dimensional space can be viewed to produce a 2-dimensional image. Since sections of the guide are movably attached, the guide sections can be adjusted to register different-sized but similarly shaped objects. Thus, an adjustable registration guide can be reused.

The techniques of the present invention are advantageous over the prior art. As discussed, one aspect of the present invention is generally directed towards an apparatus and method for contactless scanning to reduce distortion of a surface pattern caused by skin plasticity. In an illustrative embodiment, a guide provides proper registration of a hand above a scanner device for imaging. The fixture can include windows or slits so that a scanner device can produce an image such as a finger or palm in a natural state rather than being pressed against, for example, a flat surface such as glass. According to the principles of the present invention, registration of a palm and/or a finger using a fixture that keeps a hand at a fixed distance from the surface of a hi-resolution scanner can produce, in a contactless manner, non-distorted high quality images of biometric patterns on objects such as a palm and fingers of a hand.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
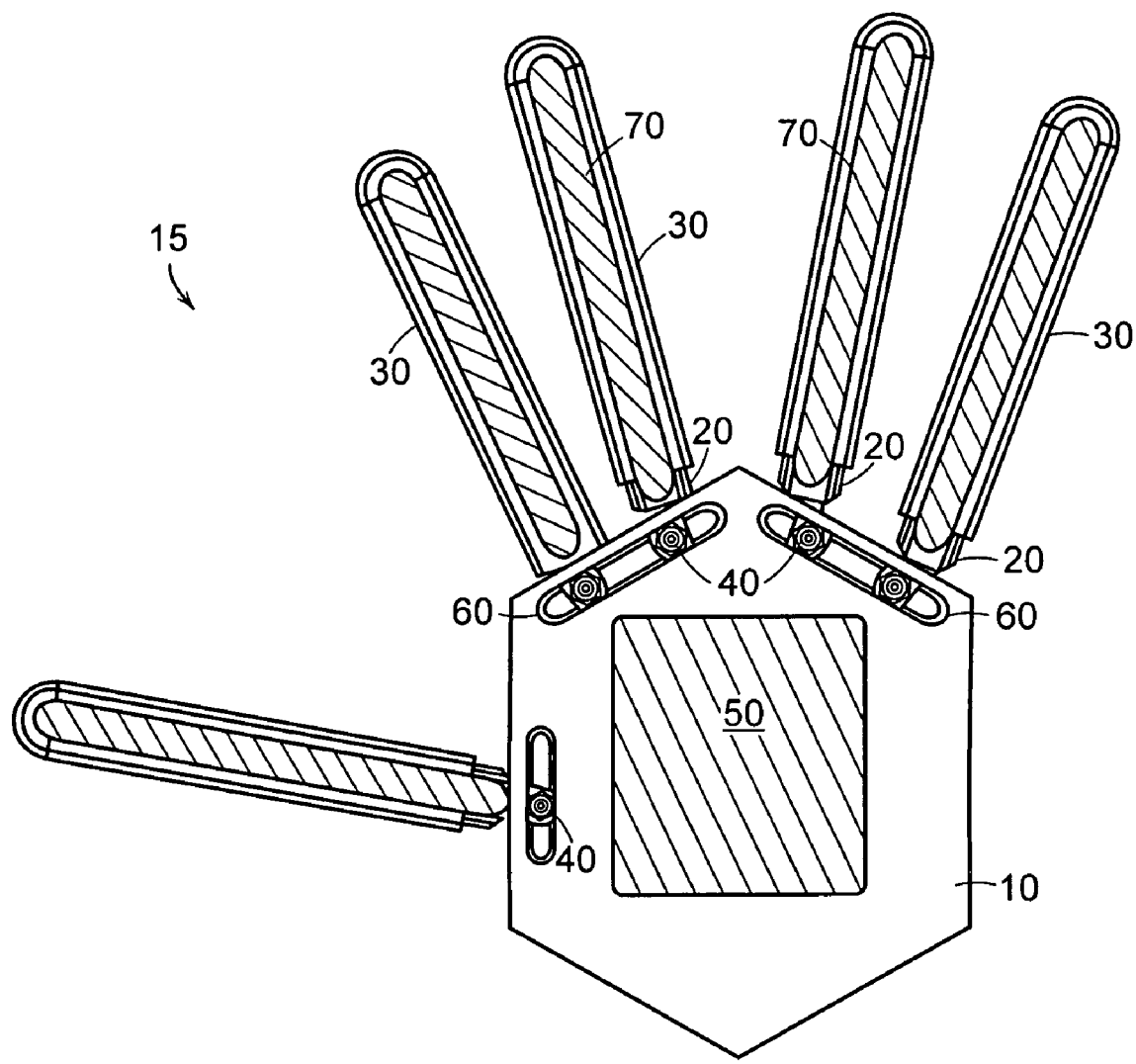
FIG. 1 is a top view diagram of a registration guide for viewing sections of a hand according to certain principles of the present invention.

FIG. 1 is a top view diagram of a registration guide 15 for positioning a hand for imaging according to the principles of the present invention.

At the core of registration guide 15 is base 10. Base 10 is optionally made of a polymer material having a thickness of approximately five millimeters to maintain an optimal distance between the palm of a hand resting in registration guide 15 and a scanner device disposed beneath registration guide 15.

As shown, base 10 includes window 50 for viewing surface patterns of a palm aligned in registration guide 15. Typically, base 10 is made of a soft plastic material so that it will not scratch or damage the glass surface of a scanner upon which the registration guide rests. Base 10 can be flat or contoured depending on a particular application and, of course, can be made of almost any material.

Figure 4B:
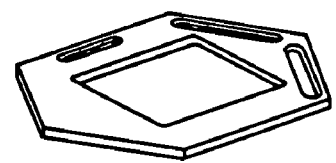
FIG. 4B is a perspective view of the base section including a window for viewing a palm according to certain principles of the present invention.
Figure 4A:
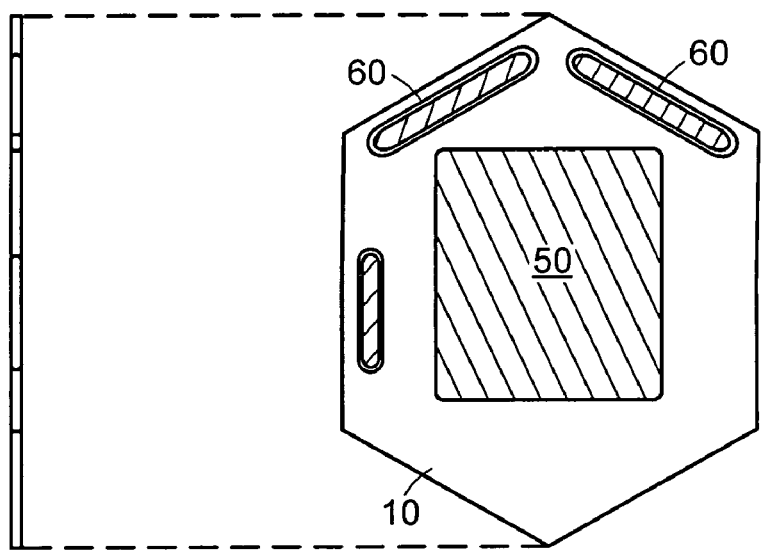
FIG. 4A is a detailed side view and top view of a base section including a window for viewing a palm according to certain principles of the present invention.

FIGS. 4A and 4B illustrate a cross-sectional and perspective view of base 10. A thickness of base 10 can vary depending on how far away an object is to be held from a scanner device during the scanning process. Some scanners devices require that an object be disposed closer to a surface of the scanner than others. For example, if the scanner is a standard copier machine capable of copying paper resting on its surface, the thickness of registration guide 15 must be minimal so that a biometric pattern to be scanned is as close to the scanning surface as possible without touching. Minimal touching of the scanned pattern can still produce an image that can be matched to a pattern stored in memory.

Figure 5:
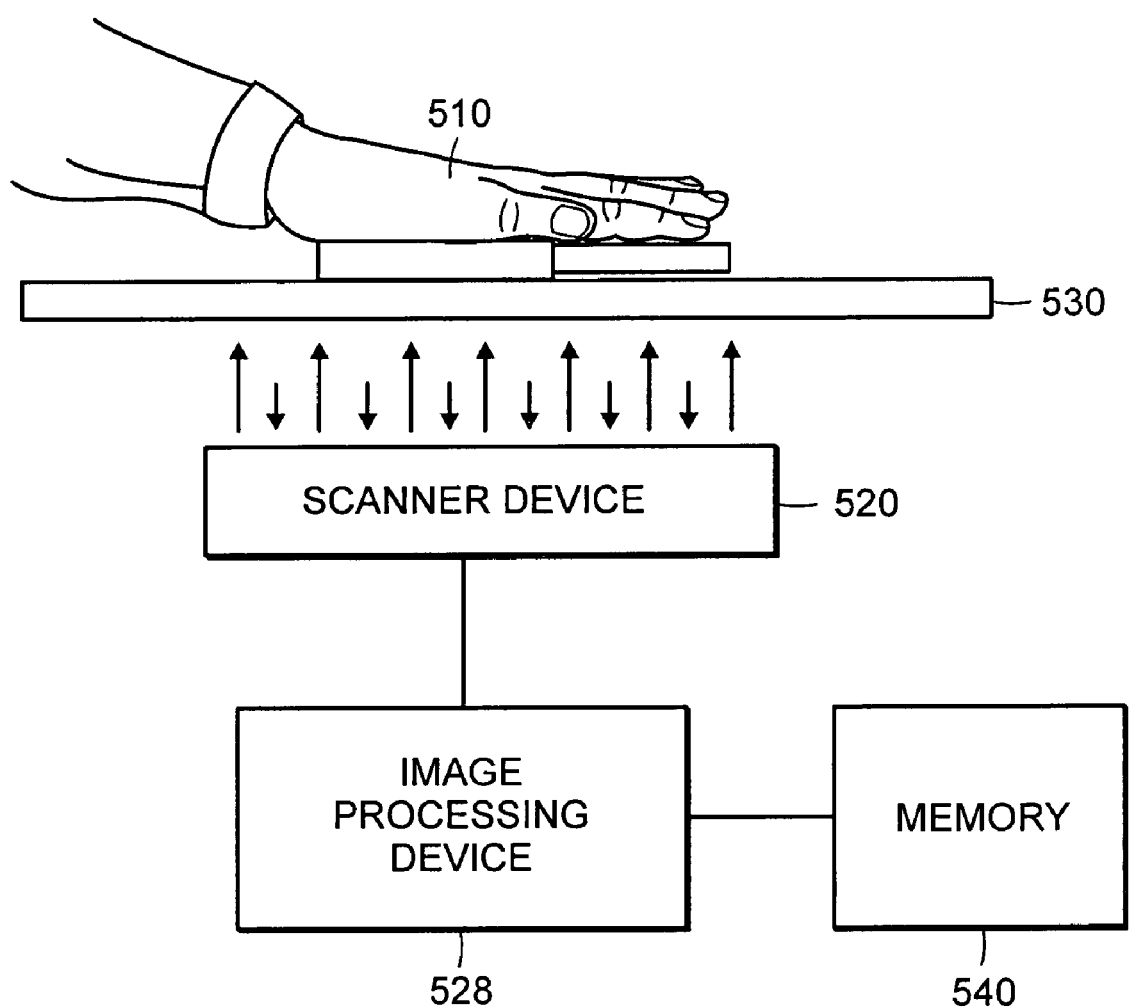
FIG. 5 is a diagram illustrating how a registration guide is used to position a hand for imaging according to certain principles of the present invention.

Palm window 50 can be cut in base 10 for viewing the palm of a hand as discussed. As shown in FIG. 5, registration guide 15 can be placed on a scanning surface while a palm resting on base 10 is scanned through palm window 50. The size and shape of palm window 50 can vary depending upon which region of a hand is to be scanned.

Referring again to FIG. 1, five base finger tracks 20 and corresponding slidable finger rails 30 are provided so that fingers of a hand are properly registered for viewing. Each finger rail 30 includes a finger window 70 for viewing fingerprints or biometric surface patterns. Accordingly, five fingers and a palm can be scanned simultaneously in their natural state using registration guide 15. Biometric patterns, therefore, are not deformed due to pressure of the finger or palm against glass.

The thickness of a finger rail 30 and finger track 20 is approximately three millimeters thick in order to maintain optimal distance between the surface region of a finger to be scanned and corresponding scanner device. Notably, this thickness can vary depending on the application as previously discussed. Finger rails 30 and finger track 20 also can be made from plastic or any suitable material.

One aspect of the present invention involves providing a universal registration guide 15 so that different sized hands can be registered for scanning using the same hand registration guide 15. Similar or same surface patterns on an object can be viewed each time the object is registered for imaging.

Some hands have wider spacings between fingers than others. To accommodate for such a variation in hand characteristics, base 10 includes pin slots 60 so that base finger tracks 20 can be spaced depending on finger spacing and hand size. More specifically, each base finger track 20 is movably connected to base 10 via a slidable pin 40. Accordingly, the angle of base finger track 20 is adjustable relative to the base 10. Also, the location of base finger track 20 where it meets base 10 via slidable pin 40 can be shifted in a slot 60 to accommodate finger spacing of a particular hand.

Another aspect of the present invention involves providing base finger tracks 20 that adjust to the length of corresponding fingers to be scanned. For example, slidable finger rail 30 is engaged with base finger track 20. Depending on the length of a finger, each finger rail 30 slides so that the tip of finger rail 30 can be lined up with the end of a corresponding finger to be scanned. Finger rail window 70 is preferably open as shown by the cross-hatched region so that a scanning device can view a biometric pattern of an object registered in finger rail 30.

One application of registration guide 15 is the registration of a hand or object above a scanner for viewing portions of a hand in their natural state. More specifically, registration guide 15 can be formed so that certain portions of a hand are appropriately positioned at a distance above a scanner for viewing biometric patterns as they appear in their natural, undeformed state. In a specific application, the biometric matter to be scanned is supported three millimeters above the surface of a scanner based on an appropriate thickness of registration guide 15.

Another application of the registration guide according to the principles of the present invention is to measure absorbed or reflected light from an exposed part of a hand. In such an application, the registration guide removes the pressure induced change in intensity of absorbed or scattered light.

Figure 2B:
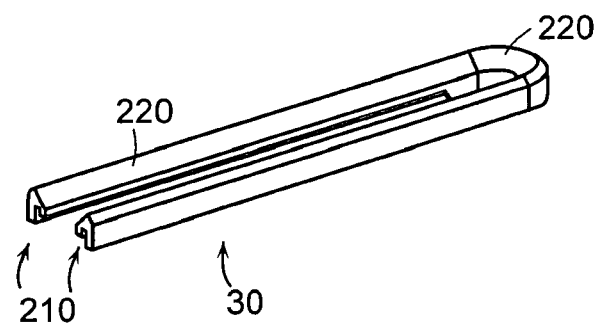
FIG. 2B is a perspective view of an upper finger rail section including an opening for viewing a section of a finger according to certain principles of the present invention.
Figure 2A:
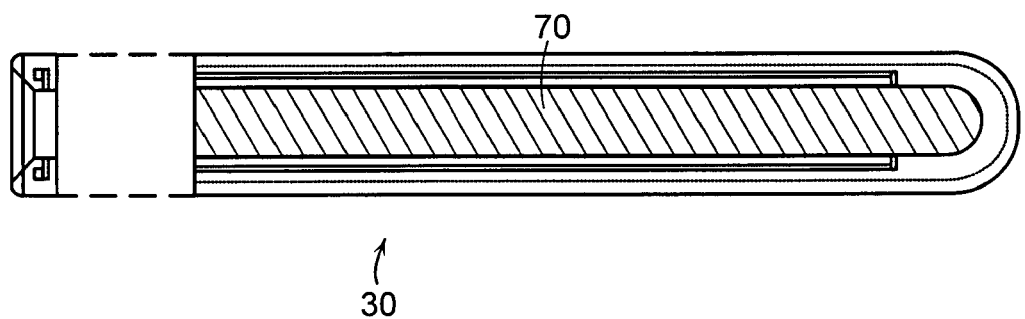
FIG. 2A is a detailed side view and top view of an upper finger rail section including an opening for viewing a section of a finger according to certain principles of the present invention.
Figure 3A:
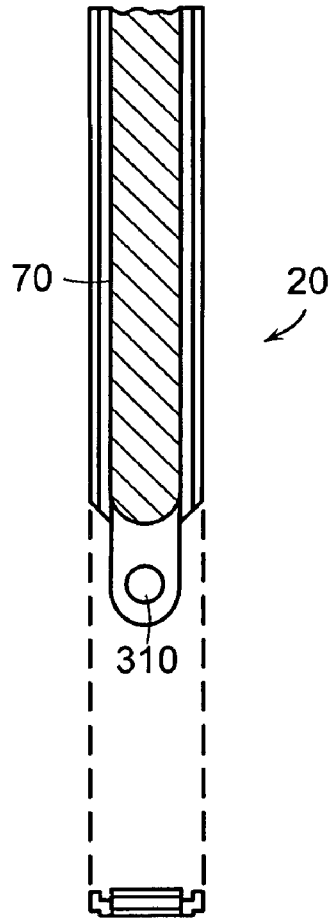
FIG. 3A is a detailed side view and top view of a lower finger rail section including an opening for viewing a section of a finger according to certain principles of the present invention.
Figure 3B:
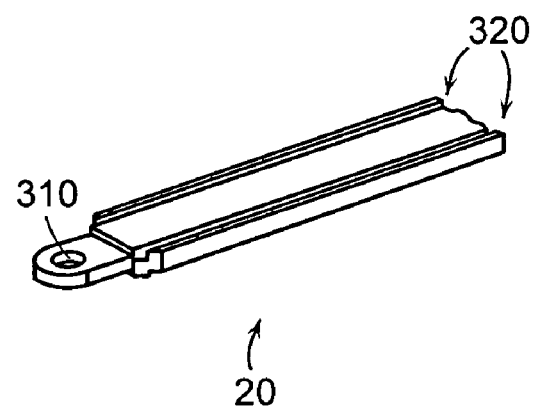
FIG. 3B is a perspective view of a lower finger rail section including an opening for viewing a section of a finger according to certain principles of the present invention.

FIGS. 2A and 2B more particularly illustrate a finger rail 30 according to the principles of the present invention. As shown, finger rail 30 can include angled edges 220 so that a finger can be comfortably registered for viewing through finger window area 70. Grooved slots 210 on the underside of finger rail 30 engage with outer tracks 320 of finger track 20 as shown in FIGS. 3A and 3B. Notably, finger window 70 is an open window so that the base portion of a finger can also be scanned as well as the tip of a finger. As previously mentioned, finger rail 30 can slide in an axial length of finger track 20 so that it can be adjusted to the size of a finger.

As shown, finger base track 20 includes a bore hole 310 through which a slidable pin 40 secures finger base track 20 to base 10. This was shown and discussed in FIG. 1.

FIG. 5 is a diagram illustrating the use of a hand registration guide 15 for contactless scanning of multiple biometrically patterned regions according to the principles of the present invention. As shown, a human hand 510 is placed in hand registration guide 15. Finger rails 30 are then adjusted to the length of each corresponding finger as previously discussed. Scanner device 520 such as a high resolution scanner then captures images of biometric patterns through palm window 50 and finger windows 70. Depending on a particular application, scanner device 520 captures color or merely black and white images. It is preferred that scanning device 520 is capable of detecting pores and other patterns in human skin so that a corresponding person can be identified based on, for example, finger and/or palm prints.

Support structure 530 is preferably glass so that scanner device 520 can shine light towards hand 510 and capture a corresponding image that is thereafter processed by image processing device 528 and stored in memory 540. Of course, two hands can be scanned simultaneously using a right and left hand registration guide 15.

Based on the application of registration guide 15 as discussed, a common region can be scanned for many different sized hands.

In addition to the advantages as previously discussed, registration guide 15 can accommodate any physical size of a palm and/or fingers even if they deviate from the norm in terms of size and shape. More specifically, registration guide 15 can be quickly and easily adjusted to fit many sizes, even in a case where a hand to be scanned includes at least one partially amputated finger.

While this invention has been particularly shown and described with references to preferred embodiments thereof, it will be understood by those skilled in the art that various changes in form and details may be made therein without departing from the scope of the invention encompassed by the appended claims.

What is claimed is:

1. A device to register a biometric object for viewing, the device comprising:
   a guide for aligning the biometric object to view multiple surface regions of the object in a substantially non-distorted state, the guide including multiple rails in which at least a portion of the object is aligned when resting therein, each rail of the guide including a window for viewing a corresponding surface region of the object; and
   a base to which each of the multiple rails is movably attached, the base including at least one window for viewing a surface pattern on the object.

2. A device as in claim 1, wherein the guide is capable of aligning different-sized but similarly-shaped objects.

3. A device as in claim 1, wherein the guide for aligning the object is disposed between the object and a scanning device that generates images of the multiple surface regions of the object through the windows.

4. A device as in claim 1, wherein the object loosely registered in the guide is identified based on at least one unique pattern as viewed through an opening of the guide.

5. A device as in claim 4, wherein a unique object is identified based on a biometric pattern of exposed flesh through a window of the guide.

6. A device as in claim 4, wherein the object is a hand in which patterns on fingers are viewed through windows of the rails and patterns on a palm are viewed through a window in the base.

7. A device as in claim 1 further comprising:
   a scanner that produces an image of the object comprising of patterns viewed through the windows of the guide to identify the object.

8. A device as in claim 7, wherein the images of the object as viewed through the windows are compared to images stored in a database.

9. A device as in claim 1, wherein the object is a human hand and the guide can be adjusted based on a length of each finger.

10. A device as in claim 9, wherein a person associated with the hand can be identified based upon a biometric pattern viewed through at least one window.

11. A device as in claim 1, wherein undistorted surface patterns of biometric matter are viewed through the windows.

12. A device as in claim 1, wherein at least one window is a void in material from which the guide is formed.

13. A device as in claim 1, wherein the guide is made of plastic.

* * * * *